Jan. 11, 1949.   L. REICHOLD   2,458,640
AUTOMATIC COFFEE MAKER
Filed Oct. 9, 1944   3 Sheets-Sheet 1

INVENTOR.
LUDWIG REICHOLD.
BY
Louis V. Lucia
ATTORNEY.

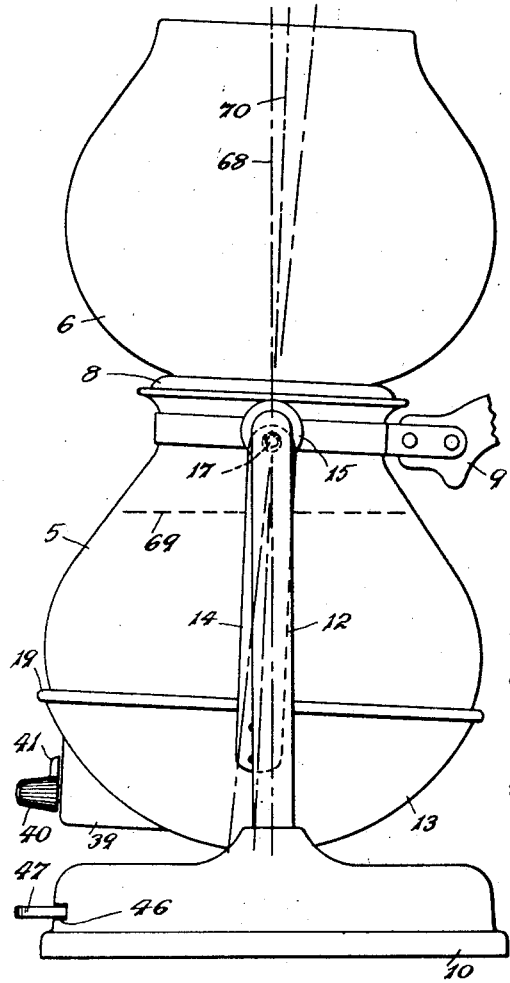

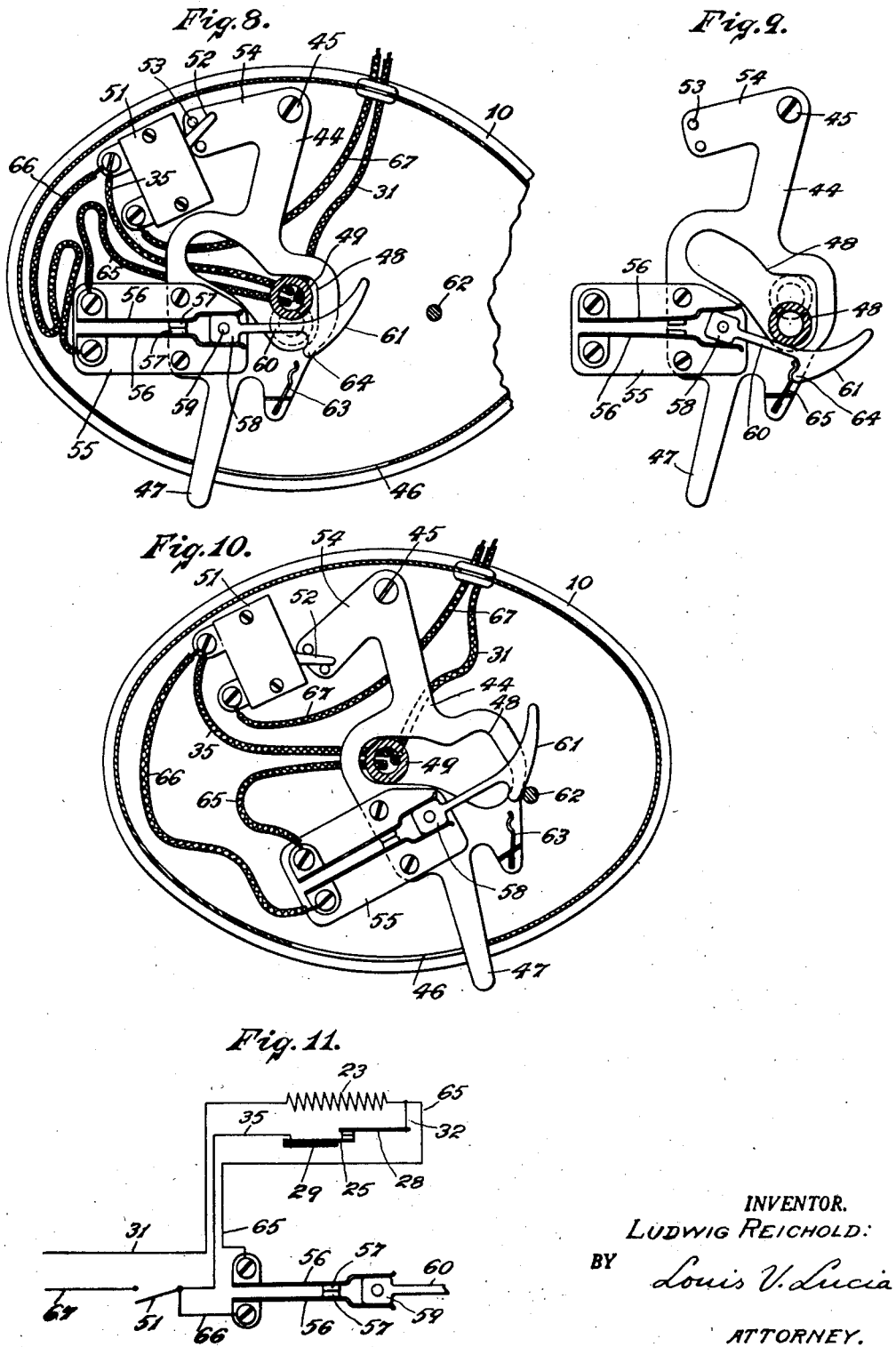

Patented Jan. 11, 1949

2,458,640

UNITED STATES PATENT OFFICE 2,458,640

AUTOMATIC COFFEE MAKER

Ludwig Reichold, Winsted, Conn., assignor to The Silex Company, Hartford, Conn., a corporation of Connecticut Application October 9, 1944, Serial No. 557,902

15 Claims. (Cl. 99—281)

This invention relates to automatic coffee makers and more particularly to a device for automatically performing a brewing operation.

An object of this invention is to provide a device which is particularly adapted for use with coffee makers of the vacuum type wherein the water is heated in a lower bowl, then forced into an upper bowl to become infused with coffee grounds therein. The brew is then transferred to the lower bowl; after which the device will operate to retain said brew at a desired temperature and ready for drinking.

The present invention operates on the principle fully described in patent to Louis V. Lucia, No. 2,181,090, November 21, 1939, "Automatic control for coffee makers," wherein during the brewing operation the coffee maker is supported slightly at an angle and, upon the liquid being transferred to the upper bowl, the said coffee maker is caused to tilt to a slightly further angle and thereby operate a mechanism for shutting off the heat.

Further objects of this invention will be more clearly understood from the following description and from the accompanying drawings in which:

Fig. 4 is a side view of my improved coffee maker showing, in broken lines thereon, the different angles assumed by the device during the operation thereof.

Fig. 5 is a similar view in central vertical section with parts shown in elevation.

Fig. 6 is a bottom view of the heating element showing the circuit control mounted thereunder.

Fig. 7 is a side view of the same in central vertical section.

Fig. 8 is a plan view on line 8—8 of Fig. 5, showing the control mechanism which is mounted in the base.

Fig. 9 is a plan view of the operating lever and switch mounted thereon in a different position.

Fig. 10 is a view similar to Fig. 8 but showing the parts thereof in a further different position.

Fig. 11 is a diagrammatic view, showing the electric circuit used in my invention.

Figure 1:
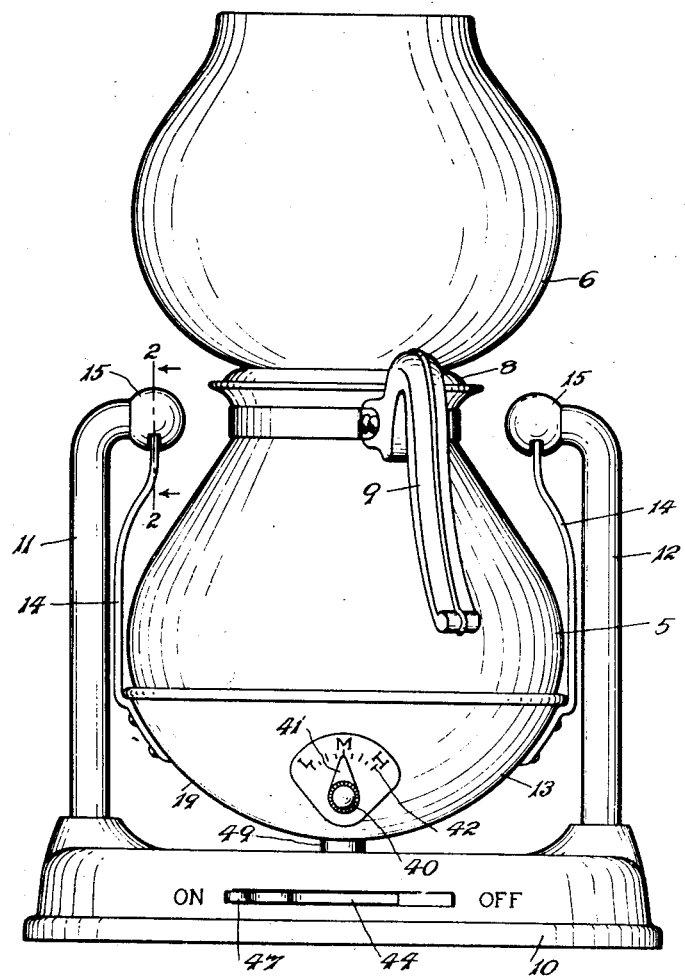
Fig. 1 is a front view of a coffee maker embodying my invention.

As illustrated in the drawings, the numeral 5 denotes the lower bowl of a vacuum type coffee maker upon which is mounted an upper bowl 6 having a stem 7 which depends into the lower bowl. A seal 8, of conventional form, is used between the upper bowl and the neck of the lower bowl to prevent the passage of air therethrough. The said bowls, when connected as shown, compose an operable coffee maker unit which may be lifted at will by the handle and detached from the controlling mechanism whenever desired.

Figure 2:
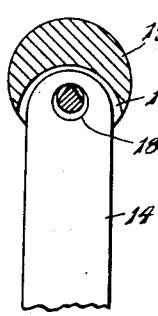
Fig. 2 is a sectional side view of one of the supporting posts on line 2—2 of Fig. 1.
Figure 3:
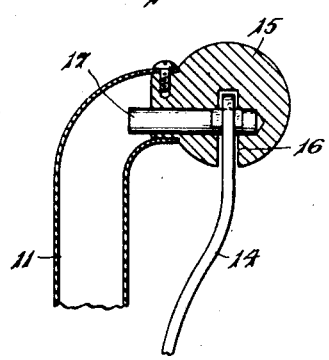
Fig. 3 is a sectional front view of the same.

The controlling mechanism illustrated comprises a base 10, preferably formed of sheet metal, having upright supports 11—12 upon which is hung a heater 13 by means of straps 14—14. The said straps are preferably hung by means of a construction as illustrated in Figs. 2 and 3 wherein a ball-shaped member 15 is provided at the end of each support 11 and 12. Each of said ball-shaped members has a slot 16 extending upwardly therein and a pivot pin 17 extending into said member and across said slot, as clearly shown in Fig. 3, and through an opening 18 in the straps 14. The pin 17 is provided with a wedge-shaped portion which engages a point in the upper portion of the opening 18 so as to provide a frictionless bearing upon which the heater 13 may swing.

The said heater 13 may be constructed of a cup-shaped frame 19 having an inserted plate 20 with a central recess 21 in which is supported a heating element of a conventional form consisting of a plate 22, of insulating material, with an electrical resistance coil 23 mounted thereon. A thermally responsive control is provided for said heater element and is mounted below said plate 22 upon an insulating block 24. The said control includes a flexible bar 25 having a contact member 26 thereon engageable with a similar contact member 27 on the flexible bar 28 which is mounted upon the opposite end of the block 24.

A bi-metallic bar 29 is secured upon the said block 24 in position to operate the bar 25 when it is flexed in response to changes in the temperature of the heating element plate 22 and the block 24. One end of the resistance coil 23 is connected to a binding post 30, as shown in Fig. 7, and the other end of the coil to a conductor 31. A conductor 32 connects the binding post 30 with the bar 28 through a screw connection 33 mounted in the block 24. The bar 25 is connected through a screw connection 34, in the opposite side of the block 24, to a conductor 35.

A temperature adjusting bar 36 extends through the wall of the recess 21, is threaded to a supporting member 37 and has an insulating tip 38 which engages the bar 28 for adjustment thereof as to be hereinafter described. The said bar 36 extends outwardly through the heater shell 19 and a hood 39 and is provided with a knob 40 having a pointer 41 thereon registering with suitable graduations and insignia upon a dial 42 at the front of said hood.

An operating mechanism is located within the base 10 and mounted upon a plate 43. The said mechanism preferably includes an operating lever 44 pivoted at 45 upon the said plate 43. The lever 44 extends forwardly from said pivotal point through a slot 46 in the base 10 and has at the end thereof a handle portion 47. Intermediate the ends of said lever there is provided an opening 48 having cam surfaces, formed by the walls thereof, for the purpose to be also hereinafter described, and a tubular projection 49 extends downwardly from the heater shell 19 through a slot 50 in the top of the base 10 and into said opening 48.

An electric circuit control main switch 51 is mounted on the plate 43 and has a projecting operating lever 52 which is actuated by projections 53 on an extension 54 of the lever 44.

A separate control switch is carried by said lever. The said switch preferably comprises a plate 55 of insulating material carrying thereon flexible bars 56—56 having engageable contact points 57—57. The said flexible points are operated by means of a cam portion 58 which is pivoted at 59 and has a lever 60 with a cam portion 61 thereon which is engageable with an operating post 62 that extends upwardly from the plate 43. A retaining member, preferably in the form of a spring 63, is mounted upon the lever 44 in position to engage a projection 64, on the lever 60, for the purpose to be also hereinafter described.

The heating element and thermally responsive circuit controlling means associated with the said heating element is connected to the operating mechanism in the base by means of conductors which extend through the tubular projection 49. The said conductors consisting of the conductor 31 which extends from one end of the resistance 23 to one side of the circuit, the conductor 35 which connects the bar 25 with one side of the main switch 51, the conductor 65 which extends from the binding post 30 to one of the bars 56 of the control switch, the conductor 66 extending from the other bar of said control switch to one side of the main switch 51, and another conductor 67 extending from the opposite side of the main switch 51 to the other end of the circuit.

The operation of the mechanism above described is as follows:

When the device is in its normal condition, the lever 44 is in the position shown in Fig. 10, wherein the cam surface at the wall of the opening 48 retains the tubular member 49 on the vertical axis, indicated by the broken line 68, and thus locking the heater 13 and the coffee maker unit, consisting of the bowls 5 and 6, in a vertical position.

When the operation of my improved automatic coffee maker is to be started, water is first placed in the lower bowl 6 to approximately the position shown by dotted line 69 in Fig. 4. The upper bowl, with the coffee grounds therein, is then mounted upon the lower bowl and the coffee maker is placed upon the heater 13. The lever 44 is then moved by the handle portion 47 to the position indicated in Fig. 8. This will move the tubular member 49 and thereby tilt the coffee maker slightly to one side to a point where the axis of the coffee maker is in the position indicated by the broken line 70. At the same time, the pins 53 on the extension 54 will operate the lever 52 of the main switch 51 and close said switch so that current will flow through the heater through the conductors 67, switch 51, conductor 66, bars 56—56 and contacts 57—57, conductor 65, the resistance coil 23 and out through the conductor 31. At this time, the bar 25 with the contact 26 thereon is retained in contact with the contact 27 on the bar 28 so that the current is also allowed to flow through the conductor 35, bar 25, contact 26, contact 27, bar 28, and conductor 32, to the resistance 23.

As the plate 22 becomes heated, by the flow of current through the resistance coil 23, heat will be conducted through the block 24 to the bi-metallic member 29. This will cause flexing of said bi-metallic member which will in turn flex the bar 25 in a direction away from the bar 28 and thereby separate the contacts 26 and 27 and break the circuit at this point. However, current may still flow through the bars 56—56 and contacts 57—57 and thereby continue the heating operation.

As the water in the lower bowl is heated, the air pressure created above the water lever in said bowl will force the water up into the upper bowl through ground coffee which is retained in the upper bowl by means of a filter such as indicated at 71. When the water has been forced into the upper bowl to substantially the level indicated by dotted line 72 in Fig. 5, the weight of said water, having been transferred from the lower to the upper bowl, will have crossed the center of gravity, which is at the point of the pivot pin 17, and thereby caused the coffee maker unit and heater to tilt slightly further to the position where its axis will be approximately on the broken line 73. This tilting movement of the coffee maker unit will swing the heater 19 and the tubular member 49 will operate the lever 60, as shown in Fig. 9, thereby rocking the cam portion 58, separating bars 56—56 and opening the circuit through the resistance coil 23 of the heater. At this point, the projection 64 on the lever 60 will engage the retaining spring 63 so that the said lever will be held in the position shown in Fig. 9 to keep said circuit open after the tubular member 49 has returned to the position shown in dotted lines. This will permit cooling of the heater and consequently of the coffee maker unit.

While this cooling is taking place, the upper bowl is being agitated by pressure which is created by the small amount of water left boiling in the bottom of the lower bowl and which pressure passes through the water in the upper bowl thus causing it to be agitated and thereby aiding to insure proper infusion with the coffee grounds.

As the coffee maker unit becomes cooled, a vacuum will be created in the lower bowl which will draw the infused water back into the said bowl and cause the coffee maker unit to tilt back and the heater to swing so that they will return with their axes in the position indicated by broken line 70 and the tubular member 49 will return to the position indicated in dotted lines in Fig. 9.

As the heater plate 22 becomes cooled, the block 24 will also cool and permit flexing of the bi-metallic bar 29 towards its normal position and consequently cause movement of the bar 25 so that the contacts 26 and 27 will engage to close the circuit and permit current to again flow through and re-energize the resistance 23 for keeping the brew warm or at any desired temperature for which the bar 28 and contact 27 may have been previously adjusted by the setting of the knob 40 and the pointer 41 thereon with relation to the selected degree indicated by the graduations 42 on the dial. It will be understood that the flow of current through the resistance 23 will be controlled to maintain the brew at a pre-determined temperature, according to the setting which has been made, so that the coffee will be ready for serving as long as the coffee maker is kept connected to a current supply.

Whenever it is desired to return the device into inoperative position, the handle portion 47 of the lever 44 is moved to the position shown in Fig. 10. This will move the tubular member to the position shown and thereby cause the coffee maker to be returned to the vertical position with its axis on the broken line 68. As the said lever 44 is moved to the position shown in Fig. 10, the cam portion 61 will engage the operating post 62 and cause the lever 60 to be returned to its normal position; thus allowing the contacts 26 and 27 to engage. At the same time, however, the main switch 51 is operated into open position so that no current will flow through the resistance 23 and the device is thereby rendered inoperative.

From the above description, it will be understood that my invention provides an automatic coffee maker which is highly efficient and positive in its operation, and which will automatically operate a circuit control for shutting off the heat supply at exactly the proper time, or just as the water has been transferred from the lower bowl into the upper bowl. My invention also provides for retaining the brew at any desired temperature so that it will be kept ready for serving. It will also be understood that the coffee maker unit, consisting of the lower and upper bowls 5 and 6 may be readily lifted off the heater 19 for pouring without requiring that the entire unit be moved.

I claim:

1. In a device of the character described, the combination of a base, uprights on said base, a heater swingingly supported by said uprights, an electric circuit for said heater, a main switch in said base for controlling said circuit, a manually operable member for moving said heater to operating position and closing said switch, a separate switch carried by said member, means carried by said heater for operating said separate switch to break said circuit, means for retaining said separate switch in open position, a thermally responsive switch for controlling said circuit while the separate switch is in open position, and means associated with said manually operable member for returning the separate switch to closed position and operating the main switch to break said circuit and thereby return the heater to normal condition.

2. In an automatic coffee maker, the combination of a base, a heater swingingly mounted on said base, an electric circuit for said heater, a main switch for said circuit mounted in said base, a manually operable lever in said base controlling said main switch, means operable by said lever for positioning said heater, a separate switch in said base operable by movement of said heater, means for retaining said separate switch in open position, a heat responsive switch for controlling said circuit while the separate switch is in open position, and heat responsive means for controlling said heat responsive switch.

3. An automatic coffee maker as set forth in claim 2 and including an abutment in said base for causing said separate switch to return to closed position upon movement thereof with said lever.

4. In an automatic coffee maker of the character described, a base, a heater swingingly mounted on said base, a projection from said heater extending through the top of said base, an electric circuit for said heater, a main switch in said base controlling said circuit, a lever pivoted in said base and having cam means cooperating with said projection for positioning said heater, a separate switch carried by said lever and operable by said projection upon the movement of said heater, a lever having cam means for opening said separate switch, a detent for retaining said separate switch in open position, and means engageable with said lever for returning said separate switch to open position.

5. In an automatic coffee maker of the character described, a base, a heater swingingly mounted on said base, an electric circuit for said heater, a projection on said heater extending through the top of said base, a main switch in said base controlling said circuit, a lever pivoted in said base and adapted to operate said switch, a separate switch carried by said lever for also controlling said circuit, a cam having a lever thereon engageable by said projection for opening said separate switch to break said circuit, a detent for retaining said separate switch in open position, and means engageable with said lever for returning it to normal position and thereby closing said separate switch.

6. A device of the character described comprising a base having a heater swingingly mounted thereon, an electric circuit for said heater, a switch in said circuit mounted in said base, an extension from said heater projecting into said base for opening said switch, a lever movable for re-setting said switch to closed position, and thermally responsive means carried with said heater for controlling said circuit after said switch has been opened; said means including a separate electric switch carried by said heater, a bi-metallic member in heat conducting relation with said heater for operating said separate switch, means for selectively adjusting said separate switch for obtaining different temperatures from said heater, and a main switch operable by said lever for controlling said circuit.

7. An automatic brewing device of the character described comprising the combination of a base, a heater swingingly mounted on said base, an electric circuit for said heater, a switch operable by said heater for controlling said circuit, a container including a lower and an upper bowl mounted upright upon said heater and adapted to tip and move said heater to open said switch upon the transfer of liquid in said container from the lower to the upper bowl, a projection on said heater extending therefrom into said base, a lever mounted in said base, and cam means in said lever engageable with said projection for positioning said heater.

8. A device as set forth in claim 7 wherein said cam means are adapted to move the heater from a position on its vertical axis to a position off said axis while at the same time operating a switch for controlling said circuit, and also for returning said heater to its vertical axis while operating the switch to open the circuit.

9. An automatic brewing device of the character described comprising a hollow base having a pair of spaced upright supports thereon, a heater swingingly mounted upon said base from a pivotal point on said supports above said heater, a container comprising a lower and an upper bowl vertically mounted upon said heater, an extension depending from the bottom of said heater into said base, a lever pivoted in said base, cam means in said lever engaging said extension; said cam means being adapted to swing said heater to move said container to a position off its center line of gravity to thereby permit tipping thereof to further move said heater, an electric circuit for said heater, and a switch operable by said further movement of the heater to open said circuit.

10. An automatic brewing device of the character described comprising a hollow base, a heater swingingly mounted upon said base, an electric circuit for said heater, an electric switch for controlling said circuit, a container carried on said heater and comprising a lower and an upper bowl, an extension from said heater into said base, a lever mounted in said base and having an opening therein receiving said extension, cam means in the edge of said opening for moving said heater to position said container relatively to its center line of gravity, and a separate switch for controlling said circuit; said lever being operable to simultaneously operate the said switch for closing said circuit while moving said heater to a position wherein the container is supported thereon off its center line of gravity to thereby permit further tipping thereof and movement of said heater upon the transfer of liquid from the lower to the upper bowl, and means operable upon said further movement of the heater to open said separate switch; the said cam means being also adapted to return the heater to a position wherein the container thereon is supported on its center line of gravity.

11. An automatic brewing device of the character described comprising a hollow base, a heater swingingly mounted on said base, a projection from said heater into said base, a circuit for said heater, a plurality of switches in said base for controlling said circuit, a lever pivoted in said base for operating said switches, and cam means in said lever engageable with said projection for moving said heater into and out of operative position relatively to said base.

12. An automatic brewing device of the character described comprising a hollow base, a heater swingingly mounted on said base, a projection from said heater into said base, a lever pivotally mounted in said base, and cam means in said lever engageable with said projection for moving said heater relatively to said base, the said cam means comprising an opening through said lever receiving said projection and having a cam shaped edge adapted to move said heater from a level to a tipped position, said opening having a portion allowing free movement of said projection to permit further tipping of the heater, and said cam means being also adapted to return the heater from the tipped to its level position.

13. An automatic brewing device as set forth in claim 11 and including an electric circuit for said heater, and a plurality of electric switches in said circuit operable by said lever simultaneously with the positioning of said heater.

14. In an automatic coffee maker of the character described, the combination of a hollow base having a heater swingingly mounted thereon, an electric circuit for said heater and a series of switches for controlling said circuit; said switches including a main switch positioned in the base for closing said circuit, a thermostatic switch in series with said switch and responsive to temperature changes in said heater for controlling said circuit, and a separate switch parallel to said thermostatic switch for rendering said thermostatic switch inoperative; the said separate switch comprising a pair of contact bars normally holding said switch in closed position, cam means between said bars, an extension from said cam means operable by movement of said heater for operating said bars to open said switch, a spring detent for engaging said extension to retain said separate switch in open position, manually operable means for moving said heater towards and away from its normal position, and a detent in said base for opening said separate switch upon operation of said manually operable member to return said heater to normal position.

15. An automatic brewing device of the character described comprising a hollow base, a heater swingingly mounted on said base, a projection on said heater extending into said base, an electrical circuit for said heater, a plurality of switches in said base for controlling said circuit, and a lever having cam means therein engaging said extension for simultaneously moving said heater to different positions and operating said switches; the said switches including a main switch operable by said lever for closing said circuit upon operation of the lever to move the heater from a normal position to an operative position, a normally closed separate switch carried by said lever, means including a lever operable by further movement of said heater to open said separate switch, a detent for retaining said separate switch in open position, and cam means on said lever engageable with a detent in said base and operable to release said lever from said spring detent to permit return of the separate switch to closed position upon operation of said manually operable lever for returning the heater to normal position.

LUDWIG REICHOLD.

REFERENCES CITED

The following references are of record in the file of this patent:

UNITED STATES PATENTS

| Number | Name | Date |
| --- | --- | --- |
| 1,462,322 | Casoletti | July 17, 1923 |
| 2,181,090 | Lucia | Nov. 21, 1939 |
| 2,008,484 | Belcher | July 16, 1935 |
| 2,232,998 | Cernohouz et al. | Feb. 25, 1941 |
| 2,266,090 | Smith | Dec. 16, 1941 |
| 2,287,571 | Purpura | June 23, 1942 |
| 2,287,583 | Weeks | June 23, 1942 |
| 2,290,660 | Wilcox | July 21, 1942 |
| 2,347,385 | Wright et al. | Apr. 25, 1944 |
| 2,385,694 | Davis | Sept. 25, 1945 |